United States Patent
Xie et al.

(10) Patent No.: US 7,707,132 B2
(45) Date of Patent: Apr. 27, 2010

(54) USER PREFERENCE TECHNIQUES FOR SUPPORT VECTOR MACHINES IN CONTENT BASED IMAGE RETRIEVAL

(75) Inventors: Hua Xie, Orange County, CA (US); Antonio Ortega, Los Angeles, CA (US)

(73) Assignee: University of Southern California, Los Angeles, CA (US)

( * ) Notice: Subject to any disclaimer, the term of this patent is extended or adjusted under 35 U.S.C. 154(b) by 335 days.

(21) Appl. No.: 11/243,501

(22) Filed: Oct. 3, 2005

(65) Prior Publication Data

US 2006/0112095 A1 May 25, 2006

Related U.S. Application Data

(60) Provisional application No. 60/615,085, filed on Oct. 1, 2004.

(51) Int. Cl.
*G06N 5/00* (2006.01)
(52) U.S. Cl. ........................................................ 706/45
(58) Field of Classification Search .................... 706/45
See application file for complete search history.

(56) References Cited

U.S. PATENT DOCUMENTS

| 6,327,581 | B1 * | 12/2001 | Platt ............................ 706/12 |
| 6,976,016 | B2 * | 12/2005 | Chang et al. ..................... 707/3 |
| 2003/0004966 | A1 * | 1/2003 | Bolle et al. .............. 707/104.1 |
| 2003/0016250 | A1 | 1/2003 | Chang et al. |
| 2003/0033347 | A1 | 2/2003 | Bolle et al. |
| 2003/0212666 | A1 | 11/2003 | Basu et al. |
| 2004/0177069 | A1 | 9/2004 | Li et al. |

OTHER PUBLICATIONS

"Support Vector Machines (SVM)" May 2004. Verified by Wayback Machine.*
Gunn, Steve. "Support Vector Machines for Classification and Regression." University of Suthampton. May 1998.*
Tuyll, Edgar. Nonparametric Estimation Wolfram MathWorld Dec. 2001 verified by wayback machine.*
Teknomo, Kardi "Strength and Weakness of K-Nearest Neighbor Algorithm" p. 1 2005.*

* cited by examiner

*Primary Examiner*—David R Vincent
*Assistant Examiner*—Ben M Rifkin
(74) *Attorney, Agent, or Firm*—Fish & Richardson P.C.

(57) ABSTRACT

Searching multimedia information which allows determining preferences based on very little amounts of data. The preferences are nonparametrically determined. Each preference is quantized into one of a plurality of bins. By doing the quantization, the distances between positive and negative samples are increased. The quantization amount may change depending on the number of samples which are used. The quantization can be used in a support vector machine or the like.

18 Claims, 2 Drawing Sheets

USER PREFERENCE TECHNIQUES FOR SUPPORT VECTOR MACHINES IN CONTENT BASED IMAGE RETRIEVAL

CLAIM OF PRIORITY

This application claims priority under 35 USC §119(e) to U.S. Patent Application Ser. No. 60/615,085, filed on Oct. 1, 2004 the entire contents of which are hereby incorporated by reference.

FEDERALLY SPONSORED RESEARCH OR DEVELOPMENT

This invention was made with government support under Contract No. EEC9529152 awarded by the National Science Foundation and Contract No. 1222477 awarded by the National Aeronautics and Space Administration. The government has certain rights in the invention.

BACKGROUND

Multimedia information is often stored on the Internet. Conventional search engines are limited in their ability to access this information. Content based information retrieval systems have been used for automatically indexing and accessing this kind of information. These systems access and index large amounts of information. Multiple features including color, texture, shape and the like are extracted from the query signals. Retrieval is then performed using a similarity matching, where the different features are matched against similar patterns. Given an input feature pattern, the matching attempts to search for similar patterns within the database.

Content based image retrieval systems leave a semantic gap between the low level features that they index, and the higher-level human concepts. Many different attempts have been made to design techniques that introduce the user into the searching loop, to enable the system to learn a user's particular preferences of query.

Relevance feedback can be used to allow the user to interactively tune the system to their own interest. This kind of feedback can be used to assess whether certain proposed images are relevant to their query or not relevant. The system learns from the examples using a machine learning technique, which is used to tune the parameters of the search. It returns a new set of similar images, and iteratively repeats the process until the user is satisfied with the result. The action is a query updating scheme, and hence can be regarded as a machine learning task.

Techniques of relevance feedback in content based information retrieval systems have conventionally used feature re-weighting. The weights associated with each feature for a K nearest neighbor classifier are adjusted based on feedback. Those features that are the best at discriminating between positive and negative samples receive a more significant weight for the distance computation.

Another technique is to set up an optimization problem as a systematic formulation to the relevance feedback problem. The goal of the optimization problem is to find the optimal linear transformation which maps the feature space into a new space. The new space has the property of clustering together positive examples, and hence makes it easier to separate those positive examples from the negative examples.

Support vector machines may be used for the relevance feedback problem in a content based retrieval system. The support vector machines or SVMs may be incorporated as an automatic tool to evaluate preference weights of the relative images. The weights may then be utilized to compute a query refinement. SVMs can also be directly used to derive similarity matching between different images.

Different techniques have been used in the context of support vector machine methods. The kernel function of such a machine usually has a significant effect on its discrimination ability.

SUMMARY

A technique is disclosed that enables searching among multimedia type information, including, for example, images, video clips, and other.

An embodiment describes a kernel function which is based on information divergence between probabilities of positive and negative samples that are inferred from user preferences for use in relevance feedback in content based image retrieval systems. A special framework is also disclosed for cases where the data distribution model is not known a priori, and instead is inferred from feedback. The embodiment may increase the distance between samples non-linearly, to facilitate learning. An embodiment uses probabilistic techniques, e.g., where underlying probabilistic models are learned based on quantization and used within a machine, such as a support vector machine, that determines distances between multimedia content, such as images.

DETAILED DESCRIPTION

Figure 1:
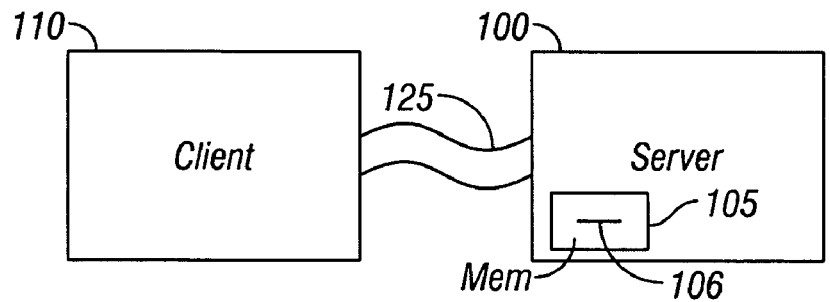
FIG. 1 is a block diagram of an exemplary system.

A block diagram of the overall system is shown in FIG. 1. A server 100 stores a plurality of multimedia information 106 in its memory 105. The multimedia information such as 106 may be indexed, or may be addressed without indexing. The server is connected to a channel 125, which may be a private or public network, and for example may be the Internet. At least one client 110 is connected to the channel 125 and has access to the content on the server.

A query is sent from the client 110 to the server 100. The query may be modeled and modified using the techniques described in this application. The query may be, for example, a request for multimedia information. For example the first query could be a "query by example", i.e., the user would first identify an image that is representative of what the user is looking for, the system would then search for images that exhibit similarity in the feature space to this "example" image. Alternatively the user may request multimedia data based on a high level concept, for example the user may request an image of a certain type, e.g., an image of "beach with a sunset". Yet another possibility is for the user to provide a non-textual description of what the user is searching for, e.g., a sketch that represents the kind of image that the user is looking for. Similar techniques can be used to search for other kind of multimedia information, e.g., videos and animations of conventional kinds (.avi's, flash, etc), sounds of compressed and uncompressed types, and others. In any of these cases, techniques are disclosed to improve the quality of the information retrieved (where quality in this context is assessed by how close the resulting query responses are to the user's interest). These improvements are achieved by successive user relevance feedback about each of the successive query responses provided by the system The server and client may be any kind of computer, either general purpose, or some specific purpose computer, such as a workstation. The computer may be a Pentium class computer, running Windows XP or Linux, for example, or may be a MacIntosh computer. The programs may be written in C, or Java, or any other programming language. The programs may be resident on a storage medium, e.g., magnetic or optical, e.g. the computer hard drive, a removable disk or other removable medium. The programs may also be run over a network.

The techniques disclosed herein employ an empirical model to capture probabilistic information about the user's preferences from positive and negative samples. In an embodiment, a kernel is derived. The kernel is called the user preference information divergence kernel. This scheme is based on no prior assumptions about data distribution. The kernel is learned from the actual data distribution. Relevance feedback iterations are used to improve the kernel accuracy.

An embodiment uses a support vector machine that operates using a non-parametric model—that is, one where the model structure is not specified a priori, but is instead determined from data. The term nonparametric does not require that the model completely lacks parameters; rather, the number and nature of the parameters is flexible and not fixed in advance. The machine may be running on either or both of the client 110 or server 100, or on any other computer that is attached to the channel 125. Other machines, such as neural networks, may alternatively be used.

Support vector machines operate based on training sets. The training set contains L observations. Each observation includes a pair: a feature vector Where $x_i \in R^n$, i can extend between 1 and L, and an associated semantic class label $y_i$. The class label can be 1, to represent relevance, or –1 to represent irrelevance. The vector x can be a random variable drawing from a distribution, which may include probabilities:

$$\{P(x|y=+1), P(x|y=-1)\}.$$

In general there can be more classes, and the feedback can take other forms. For example rather than just providing feedback as relevant or irrelevant, the user could provide a number to quantify the degree of relevance of each object.

The goal of the relevance training is to learn the mapping g, between x and y, based on the training data.

The optimal mapping may be considered as a maximum likelihood classifier:

$$g(x) = \arg\max_i P(x|y=i) \quad (1)$$

in a typical scenario of this type, there is a lot of data to carry out the training. It has been found, however, that the number of training samples in practical applications of content-based retrieval may not be sufficiently large relative to the dimensionality of the feature vector to estimate a probabilistic model of the data that can support a conventional maximum likelihood classifier. Moreover, the lack of sufficient training data may make it unrealistic to use traditional density estimation techniques. Techniques are disclosed herein to estimate the probabilistic model even with this problem. These techniques use non-parametric methods for density estimation and the resulting models are used to introduce a modified distance in the feature space, which has the property that it increases the distance between positive and negative samples.

Figure 2:
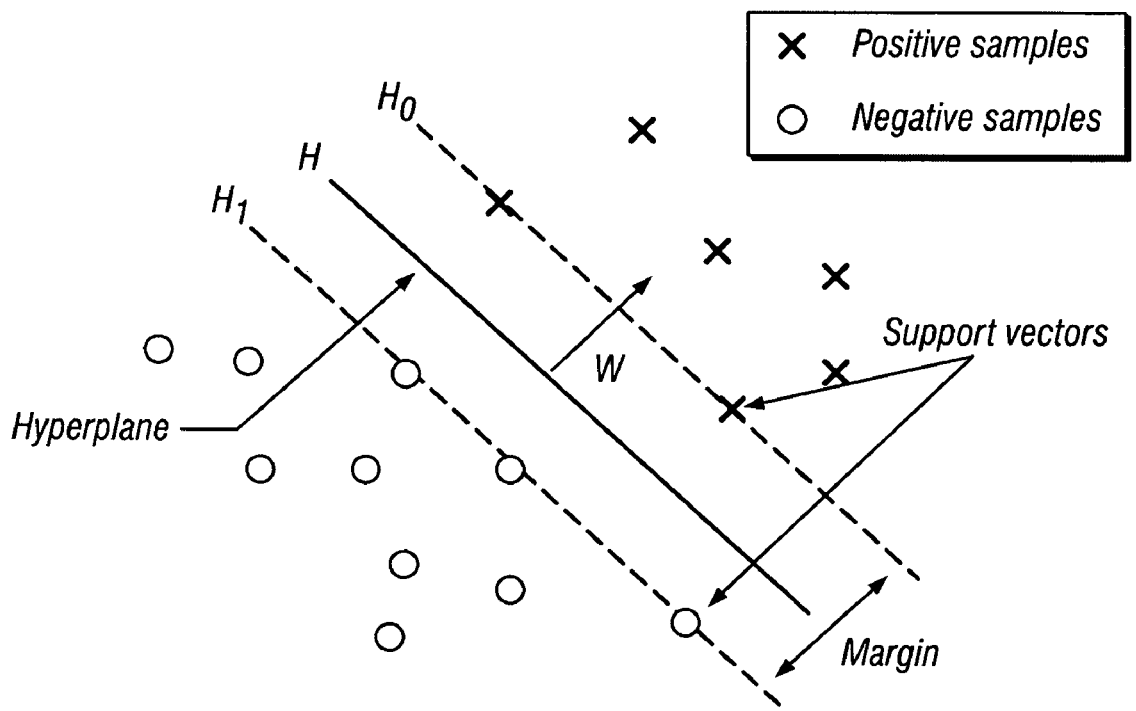
FIG. 2 shows a technique used by the support vector machine of an embodiment.

The labeled training set is denoted as: $\{x_i, y_i\}$, $i=1, \ldots, L$, $y_i \in \{-1,+1\}$, $x_i \in R^n$. Support Vector Machines are classification tools that separate data by using hyper-planes such that a maximum margin is achieved in the separation of the training data. FIG. 2 illustratively shows how all vectors labeled +1 lie on one side and all vectors labeled –1 lie on the other side of the hyperplane. Mathematically:

$$w \cdot x_i + b \geq +1 \text{ for } y_i = +1$$

$$w \cdot x_i + b \leq -1 \text{ for } y_i = -1 \quad (2)$$

where w is normal to the hyperplane H. The training vectors that lie on hyperplanes $H_0: w \cdot x_i + b = 1$ and $H_1: w \cdot x_i + b = -1$, are referred to as support vectors. It can be shown that the margin between the two hyperplanes $H_0$ and $H_1$ is simply $$\frac{2}{\|w\|}.$$

Thus, searching for the optimal separating hyperplane becomes a constrained optimization problem: minimizing $\|w\|^2$ subject to the constraints. Lagrange multipliers are used to maximize the Lagrangian objective function with respect to positive Lagrange multipliers $\alpha_i$, $i=1, \ldots, L$, subject to constraints $\Sigma_i \alpha_i y_i = 0$.

$$\max\left(\sum_i \alpha_i - \frac{1}{2}\sum_{i,j} \alpha_i \alpha_j y_i y_j x_i \cdot x_j\right) \quad (3)$$

The training samples might not be linearly separable in the original space. In an embodiment, the data is first mapped to some other Euclidean space –H (possibly infinitely dimensional) using a mapping $\Phi: \chi \mapsto H$. The training algorithm only depends on the inner products between sample vectors. A kernel function K can be defined such that $K(x_i, x_j) = \Phi(x_i) \cdot \Phi(x_j)$. Then the inner product $x_i \cdot x_j$ is replaced by $K(x_i, x_j)$ everywhere in the training algorithm. This avoids the need to explicitly compute the mapping $\Phi$. The resulting classifier takes the form $$g(x): \sum_{i=1}^{N_s} \alpha_i y_i K(x_i, x) + b. \quad \{\alpha_i, i=1, \cdots, N_s\}$$

and b are the parameters that can be learned using quadratic programming. $N_S$ is the number of support vectors.

Much of the flexibility and classification power of support vector machines resides in the kernel function, since these make it possible to discriminate within challenging data sets, e.g., those where linear discrimination may be suboptimal. Typical kernel functions include linear, polynomial and radial basis functions ("RBF"):

Linear: $K(x,z) = x \cdot z$ (4)

Polynomial: $K(x,z) = (Ax \cdot z + B)^p$ (5)

Radial Basis: $K(x,z) = e^{-\gamma \|x-z\|^2}$ (6)

Where z is another vector of the same dimension as x, and (·) denotes the inner product of two vectors. A, B, p and γ are constants that are set a priori. These kernels are generic and do not explicitly take into account the statistics of user-provided feedback information available in content-based retrieval systems. Thus, if using a support vector machines in such a system, one would have to select a kernel a priori and then the performance of the system will depend significantly on the nature of the feedback provided by the user.

In the embodiment, user feedback can be exploited in order to create a modified kernel function.

Content based retrieval systems rely on a low level similarity metric. However, the information obtained from the user through relevance feedback is often at a high level, since those perceptual interpretations of an image depend greatly on subjective feelings of the user, usage context, and the application. Generic models are not applicable to all scenarios. Accordingly, the techniques disclosed herein assist in non-parametrically learning the user's preferences empirically based on probabilistic information obtained from training data obtained from the user's feedback. This information is then used to derive a kernel that is customized for the specific user and task.

For mathematical purposes, each image is assumed to be represented by one feature vector $$x \in R^n.$$

The relevance feedback problem can then be regarded as a machine learning task whose goal is to infer the user's preference based on the information that is learned from the user labeled data. The information that is learned is arranged into a multi-dimensional feature vector $$x=(\chi_1, \chi_2, \ldots, \chi_n)^t.$$

The marginal probability of each label for each component of the feature vector is defined as $$\{P(y=+1|\chi_1), P(y=-1|\chi_1)\}.$$

Where $x_l$ is the l-th component of the feature vector. These marginal distributions can be empirically estimated from the training data obtained from successive user feedback samples. Difficulties in the estimation, however, may be expected because of two reasons: first $x_l$ can in general take values in either a large discrete set or over a continuous range. In addition, limited amounts of training data are available in any specific situation. The techniques described herein preferably use a non-parametric probability estimation approach obtained by accumulating successive iterations of user feedback.

For each feature vector component $\chi_1$, a quantizer $A_1$ is defined that includes $B_1$ reconstruction levels with $B_1-1$ decision boundaries denoted as $\{b_1, \ldots, b_{B_1-1}\}$. The probabilities $\{P(y=+1|\chi_1), P(y=-1|\chi_1)\}$ are estimated by counting the number of samples that fall in each bin:

$$P(y=\pm 1 | \chi = r_{lk}) = \frac{\sum_{i=1}^{L} 1(y_i = \pm 1) 1(|\chi_{il} - r_{lk}| \leq \Delta_{lk})}{\sum_{i=1}^{L} 1(|\chi_{il} - r_{lk}| \leq \Delta_{lk})} \quad (7)$$

where the indicator function 1(·) takes value one when its argument is true and zero otherwise. L is the number of labeled training data. $\chi_{il}$ is the l-th component of training vector $x_i$. $\Delta_{lk}$ is the size of the quantization interval along dimension l centered at reconstruction value $r_{lk}$. For those quantization bins where there is no training data, the probability can be set to zero since they make no contribution to differentiating classes. Obviously, the design of quantizers $A_l$s plays an important role in probability estimation. This embodiment uses a simple uniform quantization scheme where all quantization bins in a given feature dimension have the same size $\Delta_{lk}$, which is computed from the dynamic range of the data $[\max(\chi_1), \min(\chi_1)]$ This range changes from iteration to iteration, where the size of the range gets smaller as the number of iterations increases. The the number of quantization levels applied $B_l$ is applied as:

$$\Delta_{lk} = \Delta_l = \frac{\max(\chi_1) - \min(\chi_1)}{2xB_1} \quad (8)$$

In addition to these techniques, other techniques such as K-nearest-neighbor techniques, least squares estimation, and others can be used.

Moreover, with successive relevance feedback iterations, the amount of available training data increases. Thus, it is possible to estimate more reliably a larger number of model characteristics. For example, as the amount of available training data increases, it is possible to increase the number of quantization bins used to represent the model, thus forming smaller quantization bins. In an embodiment, the number of bins is increased in successive relevance feedback iterations, in order to provide an increasingly accurate representation of the underlying user preference model.

The probability model described above can view a feature $x=(\chi_1, \chi_2, \ldots \chi_n)^t$ as a sample drawn from a random source, which has relevance statistics given by $P^+(x)=(p_1^+, \ldots, p_n^+)$ and $P^-(x)=(p_1^-, \ldots, p_n^-)$. $p_1^\pm = P(y=\pm 1|\chi_1)$ are estimated by quantizing the component $\chi_1$ using $A_1$ based on the training data obtained from relevance feedback.

The distance between x and z, another feature vector with probability vectors $Q^+=(q_1^+, \ldots, q_n^+)$ and $Q^-=(q_1^-, \ldots, q_n^-)$. A distance is defined based on the Kullback-Leibler divergence of their probability vectors P and Q:

$$D(x \| z) = \sum_{l=1}^{n} p_1^+ \log\left(\frac{p_1^+}{q_1^+}\right) + \sum_{l=1}^{n} p_1^- \log\left(\frac{p_1^-}{q_1^-}\right) \quad (9)$$

0×log(0)=0 is bounded by continuity arguments. Since the KL divergence is not symmetric, equation (9) can be used to form a symmetric distance measure $D_s(x,z)$, as:

$$D_s(x,z) = D(x\|z) + D(z\|x) \quad (10)$$

The proposed user preference information divergency (UPID) kernel function in the generalized form of RBF kernels with the original Euclidean distance d( ) replaced by the proposed distance of (10):

$$K(x,z) = e^{-\rho D_s(x,z)} \quad (11)$$

In an embodiment, the proposed distance can also be combined with other kernel forms (such as linear, polynomial, etc.) in such a way that the formed kernel satisfies Mercer's condition.

The distance (11) is a positive definite metric, thus the proposed UPID kernel satisfies Mercer's condition. As the model parameters $a_i$, b and $N_s$ are learned from the training set, we evaluate the likelihood that an unknown object x is relevant to the query by computing its score f(x):

$$f(x) = \Sigma a_i y_i K(x, x_i) + b \quad (12)$$

Where $x_i$ is the i-th support vector and there are a total of $N_s$ support vectors, which are obtained from the learning process. Larger scores make it more likely that the unknown object belongs to the relevant class and thus should be returned and displayed to the user.

Figure 3:
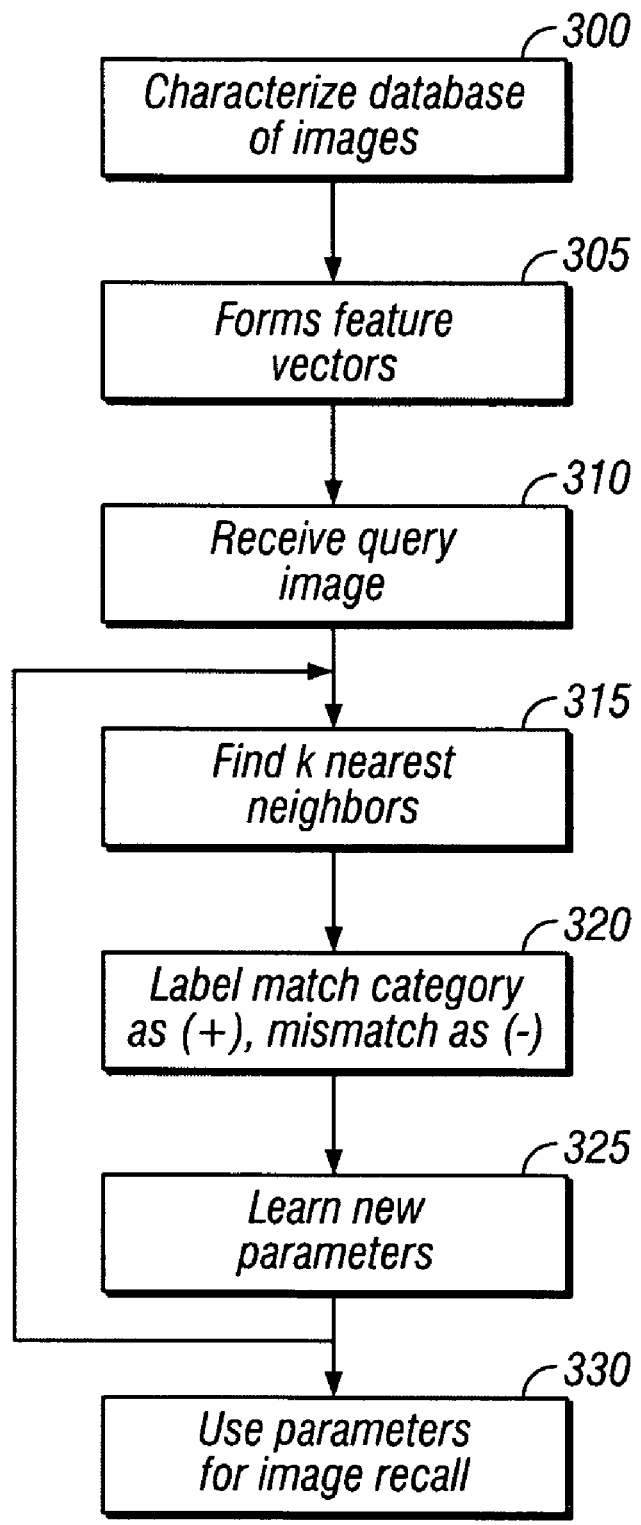
FIG. 3 shows a flowchart of operation.

In operation, the system may operate according to the flowchart of FIG. 3. The flowchart may be carried out in dedicated hardware or on a computer. The computer described herein may be any kind of computer, either general purpose, or some specific purpose computer such as a workstation. The computer may be a Pentium class computer, running Windows XP or Linux, or may be a MacIntosh computer. The programs may be written in C, or Java, or any other programming language. The programs may be resident on a storage medium, e.g., magnetic or optical, e.g., the computer hard drive, a removable disk or other removable medium. The programs may also be run over a network.

The database of images is characterized at 300. The features may be extracted by feature extraction algorithms such as those described in the literature. For example, the images may be represented in terms of color, texture and shape. Color features may be computed as histograms, texture features may be formed by applying the Sobel operator to the image and histogramming the magnitude of the local image gradient. The shape feature may then be characterized by histograming the angle of the edge. Using eight bins for each histogram, a 72 dimensional feature vector is formed at 305.

In the embodiment, the system maintains a database of images, where the image set is divided into different categories, and that database is characterized and vectored in 300 and 305. The embodiment divides the image set into the categories of sunsets, coasts, flowers, exotic cars, Maya and Aztec, fireworks, skiing, owls, religious stained-glass, Arabian horses, glaciers and mountains, English country Gardens, divers and diving, pyramids, and oil paintings. Of course, different categories could be used, but these are exemplary of the information that might be obtained. In some instances, e.g., in the retrieval of images from the Internet, there may not exist predefined semantic image categories; the system would have access to large unstructured collections of images or other multimedia objects, where each object would have an associated feature vector, but the set of feature vectors would not be otherwise structured.

Query feedback is based on the actual image categories. Quality of that retrieval result may be measured by precision and recall. Precision is the percentage of relevant objects that are to be retrieved to the query image. This may measure the purity of the retrieval. Recall is a measurement of completeness of the retrieval, for example computed as a percentage of retrieved relevant objects in the total relevant set in the databases.

This query feedback is used for a first embodiment, which allows experimental evaluation of system. In another embodiment, which, the feedback would be whatever the user provides as feedback to the system. Either and/or both of these elements, can be provided as "feedback".

At 310, a query image is received. At 315, the image is compared. In an embodiment, a first iteration is carried out where the nearest neighbors are computed based on Euclidean distance, and in later iterations, proposed modified distance is used with SVMs to compute similarity between images. At 320, the positive matches are labeled as a positive, while the negative matches are labeled as negative. In the first embodiment, the nearest neighbors with the same category as the query image are labeled as positive, and success is measured when the matching image is in the same category as a query image. In the second embodiment, the user feedback is used to mark the images that are returned as positive or negative. In effect, therefore, this system is obtaining images, and being told to find images that are like the query image.

At 325, the system learns new model parameters from these images, and then returns to repeat the process beginning at 315.

For the techniques described above, the parameters $\alpha_i$s and b are learned using equation 3 on the labeled images, and by using the classifier in equation 12 with the new set of parameters. The images with the highest score are the most likely ones to be the target images for the user. The new parameters are used to compute the similarity between any image and the query image using Equation 12. Finally, at 330, the learned parameters are used for image recall.

Although only a few embodiments have been disclosed in detail above, other embodiments are possible and the inventors intend these to be encompassed within this specification. The specification describes specific examples to accomplish a more general goal that may be accomplished in other way. This disclosure is intended to be exemplary, and the claims are intended to cover any modification or alternative that might be predictable to a person having ordinary skill in the art. For example, while the above has described this being carried out with a support vector machine, any kind of device that can carry out similar types of processing can alternatively be used.

Also, the inventors intend that only those claims which use the words "means for" are intended to be interpreted under 35 USC 112, sixth paragraph. Moreover, no limitations from the specification are intended to be read into any claims, unless those limitations are expressly included in the claims.

What is claimed is:

1. A method comprising:

Receiving a query to search for multimedia content;

Identifying items of multimedia content, the identified items determined to be likely relevant to the received query;

In response to the receiving, providing the identified items of multimedia content;

Obtaining data indicative of positive matches and negative matches from the identified items of multimedia content, a positive match indicative that an identified item likely matches a result to the search query, a negative match indicative that an identified item likely does not match the result to the search query, wherein the positive matches and the negative matches are selected based on distances obtained by mapping the data to a Euclidean space;

Iteratively training a system to provide the result of the search, wherein, in a first iteration, the system is trained based on the positive matches and the negative matchers selected based on the distances obtained by mapping the data to the Euclidean space;

Wherein information that is learned from the training is arranged into a multi-dimensional feature vector having components with labels, wherein a marginal probability of each label for each component of the feature vector is defined as $\{P(y=+1|\chi_1), P(y=-1|\chi_1)\}$.

Where $x_1$ is the l-th component of the feature vector;

Wherein the probabilities $\{P(y=+1|\chi_1), P(y=-1|\chi_1)\}$.

Are estimated by counting a number of matches that fall in each bin $\{P(y=+1|\chi_1), P(y=-1|\chi_1)\}$.

Where the indicator function l(.) takes value one when its argument is true and zero otherwise. l is the number of labeled training data, $X_{il}$ the l-th component of training vector $x_i$, $\Delta_{lk}$ is the size of quantization interval along dimension l centered at reconstruction value $r_{lk}$;

Obtaining a non-parametric model of statistics based on information divergence.

2. A method as in claim 1, wherein increasing the distance comprises compiling statistics of a user's specific matches based on said queries, and using said statistics for training said system in the second and subsequent iterations.

3. A method as in claim 1, wherein training the system, in the first iteration, based on the distances obtained by mapping the data to the Euclidean space includes increasing a Euclidean distance between the positive matches and the negative matches.

4. A method as in claim 1 wherein said obtaining a non-parametric model of statistics comprises quantizing said positive matches and said negative matches.

5. A method as in claim 3,
wherein said increasing a distance comprises using a kernel function that weights the positive matches with a first vector in a first plane, and weights the negative matches with a second vector in a second plane, and increasing a margin between said first plane and said second plane.

6. A method as in claim 1, wherein said multimedia content is one of an image, a video and/or a sound.

7. A method as in claim 3, wherein said increasing the distance comprises quantizing the positive matches and the negative matches, and further comprising decreasing a size of quantization where additional samples are obtained.

8. A method as in claim 7, where the quantization is a vector quantization.

9. An apparatus comprising:
A processor configured to perform operations comprising:
Receiving a query to search for multimedia content;
Identifying items of multimedia content, the identified items determined to be likely relevant to the received query;
In response to the receiving, providing the identified items of multimedia content;
Obtaining data indicative of positive matches and negative matches from the identified items of multimedia content, a positive match indicative that an identified item likely matches a result to the search query, a negative match indicative that an identified item likely does not match the result to the search query, wherein the positive matches and the negative matches are selected based on distances obtained by mapping the data to a Euclidean space;
Iteratively training a system to provide the result of the search, wherein, in a first iteration, the system is trained based on the positive matches and the negative matches selected based on the distances obtained by mapping the data to the Euclidean space;
Wherein information that is learned from the training is arranged into a multi-dimensional feature vector having components with labels, wherein a marginal probability of each label for each component of the feature vector is defined as $\{P(y=+1|\chi_1), P(y=-1|\chi_1)\}$.

Where $x_l$ is the l-th component of the feature vector;
Wherein the probabilities $\{P(y=+1|\chi_1), P(y=-1|\chi_1)\}$.

Are estimated by counting a number of matches that fall in each bin $\{P(y=+1|\chi_1), P(y=-1|\chi_1)\}$.

Where the indicator function 1(.) takes value one when its argument is true and zero otherwise, l is the number of labeled training data. $X_{il}$ the l-th component of training vector $x_i$, $\Delta_{lk}$ is the size of quantization interval along dimension l centered at reconstruction value $r_{lk}$.

Obtaining a non-parametric model of statistics based on information divergence.

10. An apparatus as in claim 9, wherein said processor is included in a neural network.

11. An apparatus as in claim 9 further comprising a memory which stores statistics of a user's specific matches based on said queries as training information.

12. An apparatus as in claim 9, wherein training the system, in the first iteration, based on the distances obtained by mapping the data to the Euclidean space includes increasing said distance is a Euclidean distance between the positive matches and the negative matches.

13. An apparatus as in claim 9, wherein said processor quantizes said positive matches and said negative matches.

14. An apparatus as in claim 9, wherein said increasing the distance comprises increasing the distance nonlinearly.

15. An apparatus as in claim 9, wherein said processor is operative to receive further queries for multimedia information, and retrieve said multimedia information based on said queries and said training.

16. An apparatus as in claim 9, wherein said multimedia content is at least one of an image, a video and/or a sound.

17. An apparatus as in claim 9, wherein said processor increases a distance comprises by quantizing positive and negative matches, and further decreases a size of quantization when additional samples are obtained.

18. An apparatus as in claim 9 where the processor carries out vector quantization.

* * * * *